United States Patent [19]

Whitaker

[11] 4,430,067
[45] Feb. 7, 1984

[54] VARIABLE SPEED DRIVE WITH NO SLIPPAGE BETWEEN BELT AND SHEAVES

[76] Inventor: Ranald O. Whitaker, 4719 Squire Dr., Indianapolis, Ind. 46241

[21] Appl. No.: 234,968

[22] Filed: Apr. 20, 1981

[51] Int. Cl.³ .................. F16G 51/80; F16G 51/16
[52] U.S. Cl. ...................................... 474/244; 474/265
[58] Field of Search .............. 474/242, 244, 245, 240, 474/265, 273

[56] References Cited

U.S. PATENT DOCUMENTS

| | | | |
|---|---|---|---|
| 803,810 | 11/1905 | Cutter | 474/244 |
| 1,194,962 | 8/1916 | Crowe | 474/240 |
| 2,073,846 | 3/1937 | Maurer | 474/243 |
| 2,406,253 | 8/1946 | Reeves | 474/244 |
| 2,475,264 | 7/1949 | Sutton | 474/245 |
| 2,690,678 | 10/1954 | Bendall | 474/245 |

FOREIGN PATENT DOCUMENTS 1085383  7/1960  Fed. Rep. of Germany ...... 474/245

*Primary Examiner*—Lawrence J. Staab
*Assistant Examiner*—Michael Bednarek

[57] ABSTRACT

V-belts and conical sheaves have long been used in variable ratio friction drive systems. In higher power applications the belts are replaced by metal chains carrying pins which lock to the sheaves. The latter systems are generally 90% efficient. The main loss is associated with the engagement and disengagement of the pins with the sheaves. Each pin slides radially along the sheave as it wedges into place. The loss is considerable because contact is along a line from which lubricant is extruded rather than over an area on which lubricant is present. To avoid this loss the present invention provides a shoe appended to the end of each pin. Coupling between shoe and pin is such that the shoe is permitted to slide relative to the pin in a direction radial to the sheave. It is prevented from sliding relative to the pin in a direction circumferential to the sheave. This arrangement causes the previous sliding along the unlubricated line contact between pin and sheave to be replaced by sliding along a well lubricated surface contact. This virtually eliminates the loss, virtually eliminates wear, and permits greater loads to be carried. Resultant system provides no slippage between pins and sheaves.

3 Claims, 5 Drawing Figures

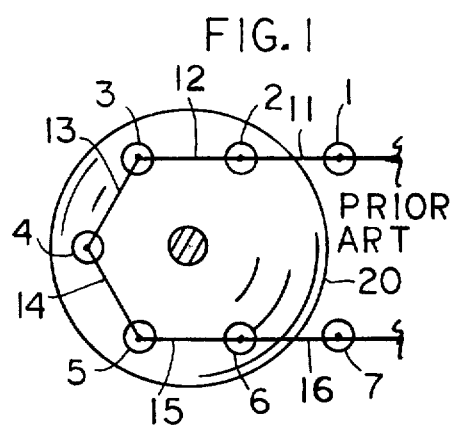
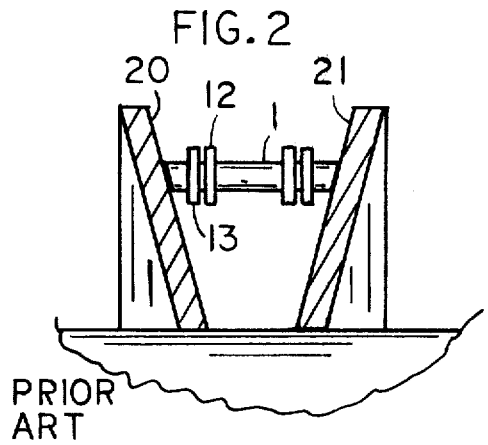
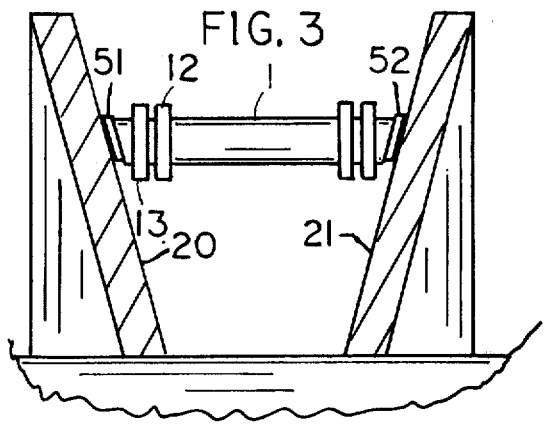
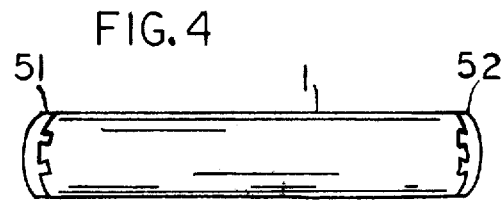
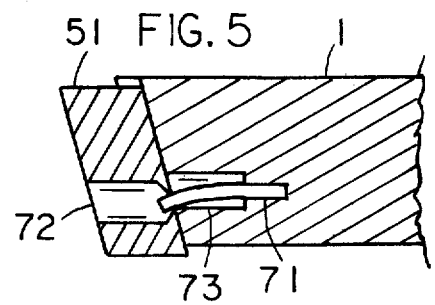

VARIABLE SPEED DRIVE WITH NO SLIPPAGE BETWEEN BELT AND SHEAVES

BACKGROUND

An infinitely variable transmission for use with automobiles is presently needed. Such a system would permit greater engine efficiency since the engine could always operate at a speed optimum for the power being delivered.

In the 75 Kw range (where present automobile engines operate) the conventional V-belt is generally replaced by a metal chain. This chain carries pins which wedge between conical sheaves. As the chain articulates onto a pair of sheaves these pins wedge between the two sheaves. During this wedging process the pins slide a short distance in a direction generally radial to the sheave. The primary loss of the system is associated with this sliding. The loss is considerable because the contact between pin and sheave is a line contact rather than an area contact. The high consequent pressure appearing at the contact extrudes the lubricant and metal bears against metal. If this sliding contact could be over a surface, pressures would be much less and lubricant would not be extruded. This would cause loss to be drastically reduced. Also, wear life would be greatly extended and higher loads could be handled.

This problem has been addressed by others. See U.S. Pat. No. 2,073,846 issued to MAURER. This patent discloses a most clever mechanism for eliminating the radial sliding. Unfortunately the mechanism provides a point contact between sheave and roller rather than the desired line contact.

For an understanding of the loss mechanism of present interest refer to FIG. 1, which is a diagram to be used in discussing chain action.

The chain contains pins 1-7 and links 11-16. The chain engages conical (raised at the center) sheave 20. Direction of rotation is counterclockwise. Links 10 and 11 carry full load. Link 16 carries no load.

For the position of the parts shown, pin 2 had just made contact with sheave 20. Sheave 20 is not entirely rigid. It can flex in both the circumferential and axial directions. Consider first the action when sheave 20 is permited to flex in the circumferential direction.

1. Sheave 20 in the region of pin 6 moves to the left, lowering the load in link 15.
2. Since the load in link 14 is now greater than the load in link 15, sheave 20 flexes in the region of pin 5 to relax the load in link 14.
3. This action repeats for link 13.
4. The result is that the link load is equal to chain load for links 11 and 12 only. The load relaxes for links 13, 14, and 15. Becoming zero for link 16.
15. The relaxation occurs in steps. A step change occurs at the time the pin in position 6 snaps loose from sheave 20. It would be reasonable to expect the relaxation to be linear—tensions in links 16, 15, 14, 13, and 12 forming an arithmetic progression.

However, the pins are compressible and the sheaves are flexible in the axial direction also. The effects of this are as follows.

1. Pin 2 moves along the indicated path as it wedges into sheave 20.
2. As pin 2 wedges in, sheave 20 flexes, permitting pin 3 to move further inward.
3. The above action tends to continue on around to pin 5.
4. Release of pin 6 permits the sheaves to snap toward each other.
5. Since static friction is greater than kinetic friction, such actions as do result from the above influences is by small jerks.
6. As pin 2 moves along the arrowed path the axial load upon it increases. This causes the frictional force to increase.

The loss associated with the movement of pin 2 (discussed above) is the integral of the product of the frictional force and the distance travelled. This is the loss which the present invention seeks to eliminate.

A second loss is the energy associated with pin and sheave flexure at the time the pin breaks loose from the sheave. This energy appears as vibrational energy in chain and sheave. It is lost. The present invention is not concerned with this loss.

A third loss is associated with rotation of pins in links. The present invention does not address this loss.

The prime loss is the work loss associated with the sliding of the pin over the sheave surface, this sliding being associated with the seating of the pin, which seating generally takes place between pin positions 2 and 3.

This loss may be minimized through combinations of the following.

1. Make the sheaves as rigid as possible. Heavy stiff material. Strong bracing.
2. Make the structure positioning the sheaves extremely rigid. Permit no movement in the axial direction.
3. Make the pins of material having a high Young's modulus—tor reduce compressibility.
4. Make pin diameter large. Make length as small as possible. This reduces compressibility. Which reduces the distance pin 2 moves as it engages sheave 20. Thereby reducing the work expended during the engagement of pin and sheave. Note that there is no corresponding work loss at disengagement—as long as the pin "snaps out". The only loss at disengagement is the spring loss associated with flexure of parts. Items 1-4 reduce this loss also.

A frontal view partially in section of two sheaves carrying a section of chain is shown in FIG. 2. The ends of pin 1 are cut at the same angle as the juxtaposed sheave surfaces 20 and 21. Generally the end of the pin is planar. The sheave surface is a cone. Consequently contact is made along a line which is the slant height of the cone. In principle this is a line contact rather than an area contact. However, as soon as a load axial to the pin is applied (as is applied by the wedging action) the surface of both pin and sheave distort, converting the line contact into an area contact. But the area is small. The result is that the pressure at the interface is very high. Any lubricant in the area is forced out and metal-to-metal contact ensues. This is good in that the higher friction associated with metal-metal contact tends to prevent slippage of pin on sheave. Which slippage in a direction circumferential to the sheave is undesirable.

However, during the seating action discussed previously it is necessary that the pin slip radially on the sheave. If the lubricant has been forced out of the interface region this slippage results in a high loss due to the increased magnitude of friction associated with the metal-metal contact. It also causes greatly increased wear of the interface surfaces.

It follows that we desire a metal-metal interface to prevent slippage of the pin on the sheave in the circumferential direction. We desire a well lubricated interface for the slippage of the pin on the sheave in the axial direction. Antipodal desiderata.

It is the purpose of the present invention to provide structure which achieves these two apparently incompatible but desired features.

PREFERRED EMBODIMENT

A shoe 51 is placed on the end of pin 1 as shown in FIG. 3. Mounting is such that shoe 51 can move relative to pin 1 in the direction indicated by the double arrow. It is constrained from movement relative to pin 1 in a direction circumferential to sheave 20. The sliding action associated with engagement of pin and sheave takes place along the interface of shoe and pin. This interface can be broad and well lubricated. Frictional force can be held very low. Consequently there is no slippage between shoe and sheave in either a direction radial to sheave 20 or in a direction circumferential to sheave 20.

Shoe 52 performs a similar function at the other end of pin 1.

A preferred structure for the shoe-pin interface is indicated in FIG. 4, which is a top view of pin 1 as shown in FIG. 3. Dovetail grooves in pin 1 and shoe 51 and 53 intermesh to provide the slippage in the direction radial to sheave 20. The dovetail prevents slippage in a direction circumferential to sheave 20.

A restraining means must be provided to prevent shoe 51 from sliding off pin 1 and for insuring that shoe 51 is biased toward its lower extreme position relative to pin 1 when shoe 51 engages sheave 20. A preferred means for accomplishing this is shown in FIG. 7. Shoe 51 is slipped onto pin 1. Spring 71 is then inserted through recessed hole 72 in shoe 51 and driven tight into recessed hole 73 in pin 1. Spring 71 is biased to hold shoe 51 toward its lower extreme position.

Pins with slanted faces as discussed here must not be grossly misaligned at time of contact with the sheaves. One means of assuring suitable alignment is to place a flat on the pin and place a D hole in at least one of the links. The flat in the D hole permits sufficient play that the pin can turn to seat properly during engagement. If the angle at the sheave axis intercepted by a link is kept below 0.1 radian this method works quite satisfactorily.

From FIG. 1 it is observed that the direction of movement of pin 1 is not radial to sheave 20. Consequently seating of pin 1 requires some circumferential movement of pin 1 as well as radial movement. If the angle intercepted by the link at the sheave axis is kept to 0.1 radian or less, flexure in the free end of the pin can accommodate the circumferential movement and no slippage will occur. Some of the required circumferential movement apparently required can be accommodated by flexure in the surface of sheave 20.

I claim:

1. In a friction drive system utilizing a chain for transferring power from an input pair of conical sheaves to an output pair of conical sheaves and in which the chain carries a set of pins which wedge between the conical sheaves;

a set of shoes, each of said shoes being appended to a respective end of a respective pin of said set of pins;

each of said shoes being adapted for making contact with the conical surface of a respective sheave of said input pair of sheaves and each of said shoes being adapted for making contact with the conical surface of a respective sheave of said output pair of sheaves, each of said contacts being generally a line contact along a slant height of said respective sheave;

appendance of each of said shoes to said respective pin being such that subsequent to the making of said line contact between said shoe and one of said respective sheaves, movement of said shoe relatie to said pin in a linear direction parallel to said line contact is permitted, and movement of said shoe relative to said pin in a direction circumferential to said sheave is not permitted.

2. A set of shoes as in claim 1;

each of said shoes being appended to said respective pin by means of dovetail grooves, said grooves running in a direction radial to said sheave when said chain is engaged to said sheave.

3. A set of shoes as in claim 1;

plus retainer means associated with each of said shoes and adapted for holding each of said shoes in engagement with said respective pin;

said retainer means being adapted for biasing each of said shoes in that direction which is toward the center of said sheave when said chain is engaged to said sheave.

* * * * *